Patented July 22, 1924.

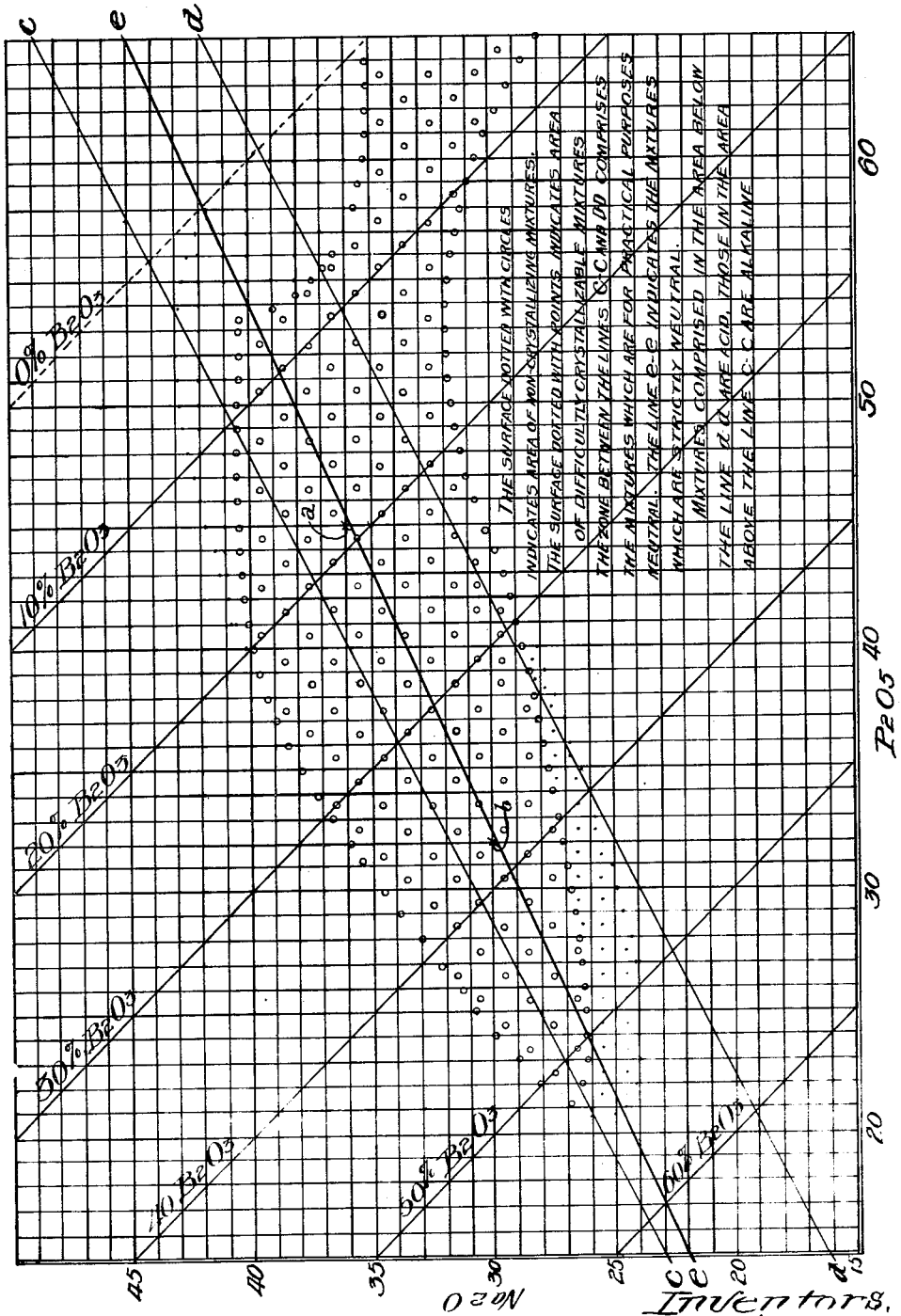

1,501,895

UNITED STATES PATENT OFFICE.

LAUNCELOT W. ANDREWS, OF CHICAGO, AND LEWIS D. MATHIAS, OF CHICAGO HEIGHTS, ILLINOIS.

COMPOSITION FOR FIREPROOFING AND OTHER PURPOSES.

Application filed July 5, 1919. Serial No. 308,781.

*To all whom it may concern:*

Be it known that we, LAUNCELOT W. ANDREWS, of Chicago, Cook County, Illinois, and LEWIS D. MATHIAS, of Chicago Heights, Cook County, Illinois, have invented certain new and useful Improvements in Compositions for Fireproofing and Other Purposes, of which the following is a specification.

The invention relates to compositions of matter and more particularly compositions for rendering fabric and other fibrous material non-inflammable, fire-resisting or fireproof.

While many such compositions are now known, their use, particularly on fabrics, is more or less unsatisfactory. In some instances, they are not stable and deteriorate, either before or after application or both, so that the fire-resisting quality imparted to the treated material is not durable. Again, they objectionably stiffen fabrics to which they are applied or, because excessively acid or alkaline or tending to become so, they injure or discolor the treated fabric. Thus, fire-proofing compositions containing or consisting of ammonium salts and which depend for their efficiency upon the liberation by heat of ammonia gas, will lose ammonia before heat is applied and so deteriorate. Also, upon the loss of ammonia gas, such compounds tend to become acid and for this reason, are liable to injure or discolor treated fabrics. Other salts applied in solution to fibrous material, fabric and the like, crystallize as the solvent evaporates and no longer adhere firmly to the treated material, and the latter is rendered dusty and stiff. In other instances, fireproofing compounds crystallize or crumble when heated, and for this reason are not highly efficient.

We have found that fireproofing solutions in which the essential ingredients are water and salts containing in combination the oxide of a fixed or non-volatile alkali metal, such as sodium oxide ($Na_2O$), phosphoric oxide ($P_2O_5$) and boric oxide ($B_2O_3$) largely avoid the objections above noted. Thus, such solutions are stable, and if the proportions of the ingredients are kept within certain limits, are non-crystallizing or non-crystallizable under ordinary conditions. That is to say, when such solutions are applied to fabric or the like and exposed to air and ordinary temperatures, they will not crystallize as the water evaporates. Instead, when thus concentrated, they are viscous, gummy or gelatinous, of a collodial nature and will stoutly adhere to the fibers of the treated material in a continuous protective film which is non-dusting and will not crystallize or crumble on exposure to ordinary atmospheric conditions. The improved mixtures are thus durable and efficient and they are not only non-crystallizing, but they do not destroy the pliability of fabrics or make them hard and stiff when applied in quantity sufficient to render the same non-inflammable or fire-resisting. Again, within the limits referred to, the ingredients may be proportioned to form a stable, non-crystallizing or difficultly crystallizable liquid which is neutral or substantially so, and hence will not injure or discolor fabrics to which it is applied. Or, if desired to suit different conditions, the mixture can be made somewhat alkaline or acid without destroying its non-crystallizing quality.

To more clearly set forth the varying proportion of the different ingredients, reference is made to the accompanying diagram in which the verticals, horizontals and diagonals represent respectively varying percentages of sodium oxide, phosphoric oxide and boric oxide, the percentages indicated being the relative amount of each of these ingredients as compared with the totally anhydrous saline matter present in the different mixtures. Thus, for example, if 36% of the totally anhydrous saline matter is sodium oxide, and 45% is phosphoric oxide, the remainder, or 19%, is boric oxide, and such a mixture could be indicated on the diagram at point *a*. Again, point *b* would indicate a mixture having as sodium oxide 30% of the totally anhydrous saline matter, as phosphoric oxide 32% and as boric oxide 38%. The area dotted with small circles in the diagram indicates mixtures which are non-crystallizing. The area dotted with points indicates difficultly crystallizable mixtures of secondary importance. It should be noted that the mixtures included within the area dotted with circles have between 26 and 41 per cent of its totally anhydrous saline matter as sodium oxide, 21 to 65 per cent as phosphoric oxide and 1 to 52 per cent as boric oxide. In addition, the mixtures included within this area, in dissolved form, are capable of retaining at ordinary room temperature, 20 parts or more of solid substance calculated on the basis of totally dehydrated saline matter in 100 parts of the solution. It should be noted, however, that while these mixtures are capable of retaining a high percentage of saline matter, they are preferably diluted before application to the material fireproofed.

While mixtures falling within the limits indicated are preferred, those outside of and adjacent to the limits of the dotted area and which contain an excess of some of the ingredients, will by partial crystallization at ordinary room temperature leave a mother liquid containing the remaining ingredients in such proportions as to fall within the desired limits. Hence, in preparing the improved compositions, although preferable to avoid waste, it is not necessary to adhere strictly to the indicated limits.

The zone between the lines $c$—$c$ and $d$—$d$ indicate mixtures which are substantially neutral and such as are most suitable for treating fabrics, although mixtures which are slightly acid may be preferred for certain purposes, for example, for treating fabrics which are colored with dyes susceptible to alkaline but not to acid reagents. On the other hand, a slightly alkaline mixture would be preferred under other conditions. The line $e$—$e$ indicates mixtures which are strictly neutral. Mixtures above the line $c$—$c$ are alkaline and those in the area below the line $d$—$d$ are acid.

The improved mixtures may be prepared in various ways, for example, from the hydrated forms of the oxides specified, but suitably mono-sodium phosphate and di-sodium phosphate with either borax or boric acid are employed.

*Example.*

If it is desired to make up a solution containing 45% of $P_2O_5$, 36% of $Na_2O$ and 19% of $B_2O_3$ calculated on the totally dehydrated saline matter, one may start with either borax, disodium phosphate and monosodium phosphate, or with boric acid, disodium phosphate and monosodium phosphate. If the first alternative be selected, the calculation of the proper amounts of these materials to use is carried out as follows: Borax, $Na_2B_4O_7.10H_2O$, has 52.88% of totally dehydrated saline matter analyzing as 69.31% of boric oxide ($B_2O_3$) and 30.69% of sodium oxide ($Na_2O$). Monosodium phosphate (without water of crystallization) $NaH_2PO_4$ contains 85% of totally dehydrated saline matter analyzing as 69.61% of phosphoric oxide ($P_2O_5$) and 30.39% of sodium oxide. Disodium phosphate, $Na_2HPO_4.12H_2O$, contains 37.15% of totally dehydrated saline matter analyzing as 53.38% of phosphoric oxide, and 46.62% of sodium oxide.

From these data, it is very easy to calculate that, to prepare 400 pounds of a fireproofing solution, containing 25% of totally dehydrated saline matter, 51.85 pounds of borax, 45.32 pounds of mono-sodium phosphate, 91.63 pounds of disodium phosphate, and 211.2 pounds of water are to be taken. The water should preferably be boiling hot, and heat should be applied until the salts are dissolved. The solution then is preferably filtered to remove undissolved impurities. This stock solution may be and is preferably diluted with water before use.

If the second alternative referred to above be elected, a similar calculation shows that 33.63 pounds of boric acid ($H_3BO_3$), 12.77 pounds of monosodium phosphate, 188.7 pounds of disodium phosphate and 164.9 pounds of water should be taken. A third method is to take 51.84 pounds of borax, 45.32 pounds of monosodium phosphate, 34.04 pounds of sodium pyro phosphate ($Na_4P_2O_7$) and 268.8 pounds of water.

As will be recognized by the skilled chemist, many materials and methods other than those given could be employed in the preparation of a solution having a given percentage of water, sodium oxide, phosphoric oxide and boric oxide. The fire-proofing qualities of a given solution will be essentially the same, whatever method of preparation is adopted.

Also, as already indicated, the proportions may be widely varied as desired to suit different conditions. Thus, a stock solution of about 45° Baumé and formed of 28.3% of monosodium phosphate (without water of crystallation), 31.7% of borax and 40% of water may be advantageously placed upon the market. One quart of the foregoing added to three quarts of water will make one gallon of a solution suitable for flame-proofing fabrics. Such a stock solution contains 40.8% of totally dehydrated saline matter, whose analysis would show 30.5% of sodium oxide, 41% of phosphoric oxide and 28.5% of boric oxide, or, based upon the total weight, about 59% of water, about 12% of sodium oxide, about 17% of phosphoric oxide and about 12% of boric oxide.

The improved mixtures under all ordinary conditions and both before and after application to treated material, are non-crystallizing and will remain viscous practically indefinitely without deterioration. After exposure, or in highly concentrated form, they are colloidal and adhere firmly to the fibers of the fabric or other material treated and will not stiffen fabrics. Indeed, when concentrated, the mixtures constitute an efficient fireproof adhesive. The mixtures can be made strictly or substantially neutral, or of a desired degree of alkalinity or acidity to avoid injury or discoloration of fabrics or the like.

The fireproofing qualities are excellent and probably largely due to the fact that these mixtures have the property of maintaining a viscous and continuous protective film throughout a wide range of temperatures extending from that of the air up to a red heat. The mixtures in dissolved form undoubtedly comprise various salts, but not all the chemical compounds present can be accurately determined. Largely, for this reason, the composition is given in percentages of the oxides present in the totally dehydrated saline matter. The improved mixtures are preferably marketed in concentrated liquid form, which are preferably diluted before application for fireproofing purposes. In concentrated form, as stated, they constitute efficient fireproofing adhesives. In this form too, a mixture containing relatively high percentage of boric oxide can be satisfactorily employed as a soldering flux.

Obviously, changes can be made in the details set forth without departure from the essentials of the invention as defined by the claims.

We claim as our invention:

1. A composition for fireproofing and other purposes comprising as its essential ingredients combinations of a fixed alkali metal oxide, phosphoric oxide and boric oxide in proportions to form, when dissolved in water, a solution non-crystallizing on exposure to ordinary atmospheric conditions.

2. A composition for fireproofing and other purposes comprising, as its essential ingredients, a fixed alkali metal oxide, phosphoric oxide and boric oxide in combination and in proportions to form in solution a mixture non-crystallizable under ordinary conditions.

3. A composition for fireproofing and other purposes comprising, as its essential ingredients, a fixed alkali metal oxide, phosphoric oxide and boric oxide in combination and in proportions to form in solution a substantially neutral mixture.

4. A composition for fireproofing and other purposes comprising, as its essential ingredients, a fixed alkali metal oxide, phosphoric oxide and boric oxide in combination and in proportions to form in solution a substantially neutral, non-crystallizing mixture.

5. A fireproofing solution containing as its essential ingredients water and salts whose analysis would show an oxide of a fixed alkali metal, phosphoric oxide and boric oxide in substantially the proportions specified to form a solution non-crystallizable under ordinary conditions.

6. A fireproofing solution containing as its essential ingredients water and salts whose analysis would show sodium oxide, phosphoric oxide and boric oxide in substantially the proportions specified to form a solution non-crystallizing under ordinary conditions.

7. A fireproofing solution containing as its essential ingredients water and salts whose analysis would show sodium, phosphoric and boric oxides in substantially the proportions as follows: water about fifty-nine per cent, sodium oxide about twelve per cent, phosphoric oxide about seventeen per cent and boric oxide about twelve per cent.

8. A fireproofing solution containing as its esential ingredients, water and salts whose analysis would show sodium oxide, phosphoric oxide, and boric oxide in proportions to form a viscous, substantially neutral, non-crystallizing liquid.

9. A fireproofing composition comprising alkali metal phosphate and a borate in proportions to form an aqueous solution non-crystallizing on exposure to ordinary atmospheric conditions.

10. An aqueous fireproofing solution containing derivatives of an alkali metal, phosphoric and boric acids, substantially as and in the proportions specified and non-crystallizing on exposure to ordinary atmospheric conditions.

LAUNCELOT W. ANDREWS.
LEWIS D. MATHIAS.